US005647111A

United States Patent [19]

Zienkiewicz et al.

[11] Patent Number: 5,647,111

[45] Date of Patent: Jul. 15, 1997

[54] AUTOMATIC SEALANT APPLICATION APPARATUS AND METHOD

[75] Inventors: John W. Zienkiewicz, North Tonawanda; Bradley M. Roberts, Williamsville, both of N.Y.

[73] Assignee: Gemcor Engineering Corp., Buffalo, N.Y.

[21] Appl. No.: 386,117

[22] Filed: Feb. 9, 1995

[51] Int. Cl.$^6$ .............................. B23P 23/04; B23P 11/00; B05C 7/00

[52] U.S. Cl. .......................... 29/34 B; 29/243.53; 118/711

[58] Field of Search ................................ 29/34 B, 243.53, 29/243.54, 33.16; 118/711

[56] References Cited

U.S. PATENT DOCUMENTS

| | | | |
|---|---|---|---|
| 4,359,965 | 11/1982 | Bridges, Sr. | 118/711 |
| 4,578,846 | 4/1986 | Schott et al. | 29/34 B |
| 4,951,849 | 8/1990 | Townsend et al. | 29/34 B X |

*Primary Examiner*—William R. Briggs
*Attorney, Agent, or Firm*—Hodgson, Russ, Andrews, Woods & Goodyear LLP

[57] ABSTRACT

In an automatic fastening machine for installing fasteners in a workpiece and including at least one tool for performing a fastener installation operation on the workpiece, a component such as one of the tools for holding a fastener in spaced relation to the workpiece prior to installation therein and sealant applicator apparatus movable into and out of operative association with the fastener for applying sealant to the fastener prior to installation in the workpiece. Sealant application to the fastener is provided automatically as part of the fastener installation operation. The sealant applicator apparatus comprises a pair of sealant applicators in spaced-apart opposed facing relation and movable toward each other into sealant applying relation with the fastener. Each sealant applicator has an end shaped to confirm to a portion of the outer surface of the fastener. The applicators are readily removable to facilitate maintenance and replacement.

19 Claims, 5 Drawing Sheets

AUTOMATIC SEALANT APPLICATION APPARATUS AND METHOD

BACKGROUND OF THE INVENTION

This invention relates to the art of automatic fastening machines, and more particularly to a new and improved apparatus and method for applying sealant to fasteners prior to installation by such machines.

One area of use of the present invention is in automatic drilling and riveting machines where a drill forms a hole in a workpiece and then a fastener, such as a rivet, is inserted in the hole and upset in the workpiece. However, before the inserting and upsetting operations it often is necessary to apply a liquid sealant to the fastener which sets-up after the upsetting operation to enhance the fluid-tight nature of the joint between the rivet and workpiece. An example of the foregoing is in riveting aircraft wings wherein fuel storage regions are defined within the wings.

In the design of apparatus to perform such sealant application, several important objectives should be met. Any sealant application method and apparatus should be compatible with, preferably a part of, the fastener installation operation. Furthermore, variations in size and types of fasteners should be accommodated. In addition, due to the nature of the sealant material, maintenance and replacement of the apparatus or its components should be convenient.

SUMMARY OF THE INVENTION

It is, therefore, a primary object of this invention to provide a new and improved method and apparatus for applying sealant to fasteners prior to installation in a workpiece by an automatic fastening machine.

It is a more particular object of this invention to provide such a method and apparatus for applying sealant which is automatic and a part of the fastener installation operation performed by such machines.

It is a further object of this invention to provide such a method and apparatus for applying sealant which readily accommodates size and type variations among fasteners.

It is a further object of this invention to provide such a method and apparatus for applying sealant wherein maintenance and replacement of components is convenient.

It is a more particular object of this invention to provide such a method and apparatus for applying sealant which is relatively simple in structure and operation and efficient and effective in use.

The present invention provides, in an automatic fastening machine for installing fasteners in a workpiece and including at least one tool for performing a fastener installation operation on the workpiece, means such as one of the tools for holding a fastener in spaced relation to the workpiece prior to installation therein and sealant applicator means movable into and out of operative association with the fastener for applying sealant to the fastener prior to installation in the workpiece. Thus, sealant application to the fastener is provided automatically as part of the fastener installation operation. The sealant applicator means comprises a pair of sealant applicators in spaced-apart opposed facing relation and movable toward each other into sealant applying relation with the fastener. Each sealant applicator has an end shaped to confirm to a portion of the outer surface of the fastener. The applicators are readily removable to facilitate maintenance and replacement.

The foregoing and additional advantages and characterizing features of the present invention will become clearly apparent upon a reading of the ensuing detailed description together with the included drawing wherein:

BRIEF DESCRIPTION OF THE DRAWING FIGURES

DETAILED DESCRIPTION OF THE ILLUSTRATED EMBODIMENT

Figure 1:
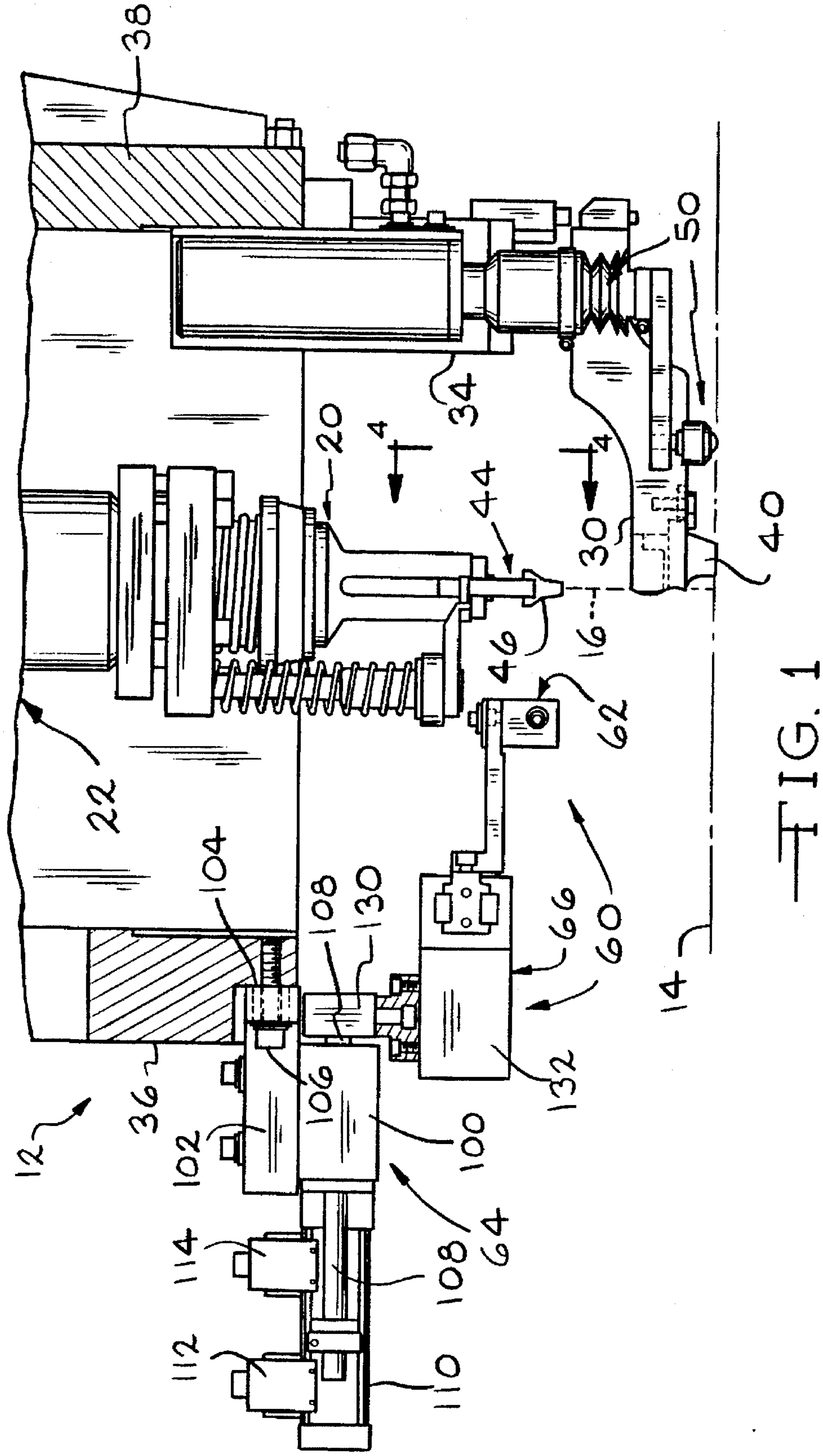
FIG. 1 is a fragmentary front elevational view of an automatic fastening machine having sealant applicator means according to the present invention.
Figure 2:
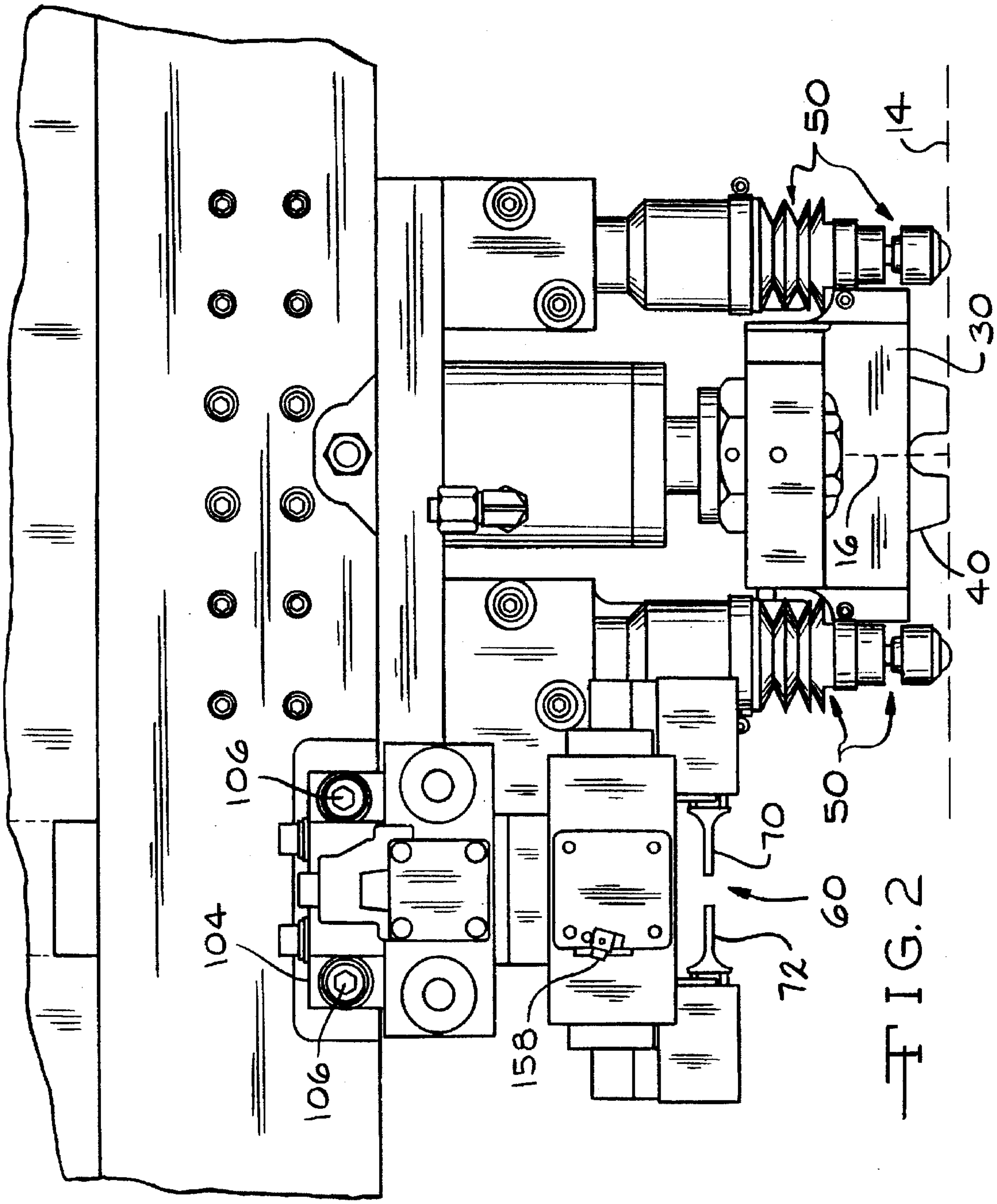
FIG. 2 is a fragmentary side elevational view of the automatic fastening machine of FIG. 1 and further illustrating the sealant applicator means of the present invention.
Figure 3:
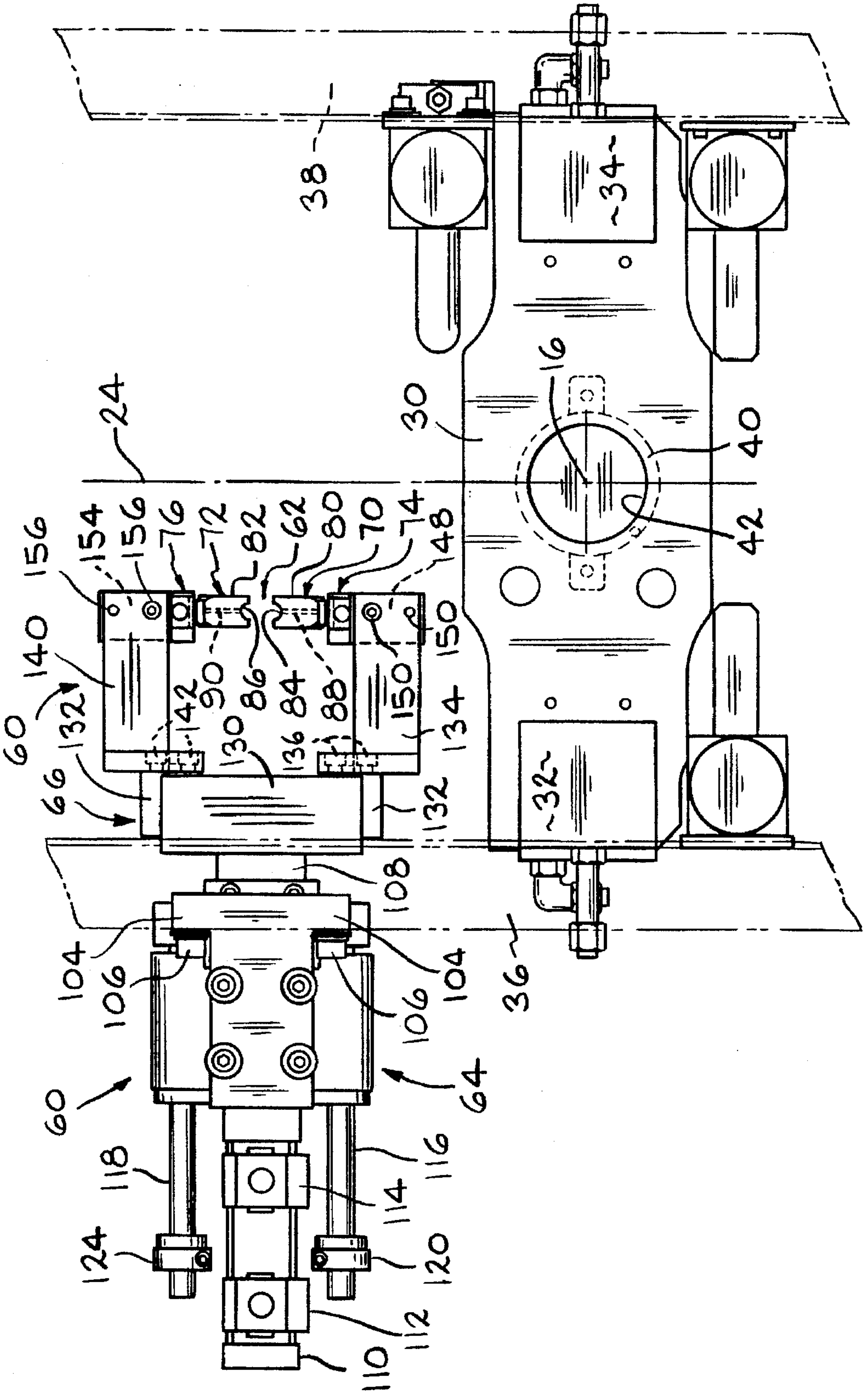
FIG. 3 is a fragmentary plan view of the automatic fastening machine of FIG. 1 and further illustrating the sealant applicator means of the present invention.

FIGS. 1–3 illustrate an automatic fastening machine to which the present invention is applicable. The machine shown is an automatic drilling and riveting machine which includes an upper head assembly 12 and a lower head assembly (not shown) which typically are carried by the upper and lower portions of a C-frame structure (not shown). A workpiece designated schematically at 14 in FIGS. 1 and 2 is between the upper and lower heads during the fastener installation operations performed by the machine. A work axis, represented by broken line 16 in FIG. 1, is disposed substantially normal to a plane containing workpiece 14, and the axis 16 is substantially centered at a location on the workpiece where a fastener is to be installed. Thus, there similarly is a work axis at each location of fastener installation on workpiece 14.

The automatic fastening machine includes at least one tool movable into and out of registry with workpiece axis 16 for performing a fastener installation operation on workpiece 14. Preferably a plurality of such tools are provided, at least a drill for forming a fastener receiving hole in workpiece 14 and a fastener inserting and upsetting tool generally designated 20 in FIG. 1. Additional tools can be included in the machine depending upon the nature of the fastener installation operation as is well-known to those skilled in the art. The tools are in spaced-apart relation in upper head 12 and are carried and moved by a transfer means 22 in the form of a transfer plate assembly along a transfer path designated 24 in FIG. 3. Transfer path 24, which extends normal to the plane of the paper as viewed in FIG. 1, is disposed in substantially orthogonal relation to work axis 16. The tools are moved successively into and out of registry with work axis 16. When a tool is in registry with work axis 16 the longitudinal axis of the tool is in alignment with work axis 16. In this position, each tool then is moved toward and away from workpiece 14 for performing fastener installation operations all in a manner well-known to those skilled in the art.

In the automatic fastening machine shown in FIGS. 1–3 there is a pressure foot comprising a pressure foot plate 30 disposed in a plane generally parallel to the plane of workpiece 14 and connected to a pair of pneumatic cylinders 32, 34, one at each end of plate 30 which cylinders 32 and 34 are supported by portions 36 and 38, respectively, of the machine frame. Plate 30 is provided with a pressure foot bushing 40 mid-way between the ends and sides thereof which defines an opening 42 through which the tools move toward and away from workpiece 14 in performing fastener installation operations. As shown in FIG. 3 the center of opening 42 is coincident with work axis 16 when the machine and hence the pressure foot are positioned for fastener installation. Cylinders 32, 34 operate to move the pressure foot and in particular the pressure foot bushing 40 into contact with workpiece 14 for clamping the same during installation of a fastener in a known manner. Cylinders 32, 34 also operate to move the pressure foot away from or out of contact with workpiece 14 when the machine moves to the next location on workpiece 14 for installation of the next fastener in a known manner.

In a typical, basic fastener installation operation the pressure foot bushing 40 is moved into contact with workpiece 14 as previously described and the drill is moved by transfer means 22 along transfer path 24 so that the drill longitudinal axis is in registry with or coincident with the work axis 16 at the location of workpiece 14 where the fastener is to be installed. Transfer means 22 is movably supported in the machine frame portions 36, 38 and operated by suitable motive means such as a fluid cylinder all in a known manner. The drill is moved along work axis 16 by suitable motive means such as a fluid cylinder toward workpiece 14 through pressure foot opening 42 and the drill bit and spindle thereof are rotated by another motor. The drill is moved along work axis 16 a distance sufficient to drill a hole in workpiece 14 whereupon the drill then is moved in the opposite direction along axis 16, i.e. away from workpiece 14, back to its original position.

At sometime prior to or during the above-described drilling operation, a fastener is conveyed from a storage location on the machine into fastener receiving inserting and holding means 44 or fingers shown in FIG. 1 on fastener inserting and upsetting tool 20 all in a known manner. This is done while tool 20 is on transfer path 24 but at a location out of registry with work axis 16. FIG. 1 shows a fastener 46 which has been placed in the holding fingers 44 of tool 20 as described.

In the next step in the basic and illustrative fastener insertion operation, the drill is moved by transfer means 22 along transfer path 24 to a location out of registry with work axis 16 and simultaneously the fastener inserting and upsetting tool 20 is moved by transfer mean 22 along the transfer path into registry with work axis 16. Then tool 20 is moved along axis 16 toward workpiece 14 through pressure foot opening 42 by suitable motive means such as a fluid cylinder. Tool 20 functions to insert fastener 46 into the hole previously drilled in the workpiece and, in cooperation with a ram on the lower head of the machine, to upset the fastener into the workpiece all in a manner well-known to those skilled in the art. Then tool 20 is moved in the opposite direction along axis 16, i.e. away from workpiece 14 back to its original position. After that, the pressure foot is moved away from workpiece 14 and the machine moves along workpiece 14 to the next fastener installation location.

The automatic fastening machine and fastener installation operation thus described is typical and illustrative of those well-known to persons skilled in the art. For a more detailed description of such machines and operations, reference may be made to U.S. Pat. No. 4,720,897 issued Jan. 26, 1988 entitled Automatic Fastening Machine and assigned to the assignee of the present invention, the disclosure of which is hereby incorporated by reference.

The components generally designated 50 in FIGS. 1–3 are sensors for indicating to the machine the presence of workpiece 14 and play no role in nor have any bearing on the subject matter of the present invention.

In many fastener installation operations, particularly in riveting aircraft wings wherein fuel storage regions are defined within the wings, a sealant in liquid form must be applied to the fastener before insertion and upsetting in the workpiece. The sealant then sets up in a typical manner after installation in the workpiece. The present invention advantageously provides application of such sealant automatically as a part of the automatic fastener installation operation. In particular, the present invention provides sealant applicator means generally designated 60 carried by the machine and movable into and out of association with the transfer path 24 for applying sealant to a fastener prior to installation in workpiece 14 and while the fastener is held at a location on the transfer path. In the fastening machine shown, fastener 46 is held by tool 20 prior to installation in workpiece 14 and sealant applicator means 60 is movable from a location out of transfer path 24 to a location associated with path 24 and in operative association with fastener 46 carried by tool 20 for applying sealant to fastener 46 carried by tool 20 prior to installation in workpiece 14 when fastener 46 is at a location on transfer path 24 out of registry with work axis 16 and another one of the tools, i.e. the drill, is in registry with work axis 16 for performing an operation on workpiece 14.

The sealant applicator means 60 of the present invention comprises a sealant applicator generally designated 62, first motive means 64 for moving applicator 62 from a location out of transfer path 24 as shown in FIGS. 1 and 3 to a location in operative association with transfer path 24, and second motive means 66 for moving applicator 62 into operative association with the fastener for applying sealant to the fastener. In preferred form applicator 62 comprises a pair of applicator elements 70, 72 in spaced-apart opposed facing relation as shown in FIGS. 2 and 3. The elements 70, 72 are finger-like and movable toward and away from each other in jaw-like fashion. A single motive means 66 in the form of a gripper element which will be described moves the applicators 70 and 72 into operative association with the fastener for applying sealant thereto.

Each of the sealant applicators 70, 72 comprises an elongated body 80, 82 as shown in FIG. 3 having one end received in a corresponding one of a pair of applicator housings 74 and 76 and having another end 84, 86 shaped to conform to a portion of the outer surface of the fastener. Each of the sealant applicators 70 and 72 also has passage means 88 and 90, respectively, extending along within the body to the shaped end 84 and 86 for conveying sealant to the outer surface of the fastener. Preferably each shaped end 84, 86 is arcuate and substantially semi-circular so as to conform to a fastener having a cylindrical shank, and the passage means 88, 90 open at a location substantially mid-way along the corresponding shaped ends 84, 86.

The first motive means 64 comprises a fluid-operated powered slide 100 including a housing 102 fixed by a bracket 104 and fasteners 106 to the machine frame portion 36. By way of example, in an illustrative apparatus, powered slide 100 is commercially available under the designation PHD-T series. Operation of slide 100 extends and retracts an output plunger or rod 108 to move applicator 62 comprising the components 70, 72 into and out of association with transfer path 24 as will be described. An extension 110 of slide housing 102 carries a pair of spaced apart limit switches 112, 114 in the form of reed switches. A pair of rods 116 and 118 extend from housing 102 on opposite sides of extension 110 and carry a corresponding pair of switch operators 120 and 124, respectively. Extension and retraction of output plunger 108 causes corresponding movement of rods 116, 118 and the switch operators 120, 124 to activate the switches 112, 114 to signal the machine control as to the position of applicator 62.

The first motive means 64 is operatively coupled to applicator 62, i.e. the pair of applicator elements 70, 72 in the following manner. The output rod or plunger 108 of powered slide 100 is connected to an adaptor 130 which, in turn, is fixed to a parallel gripper element 132. By way of example, in an illustrative apparatus, gripper 132 is commercially available under the designation PHD robotic gripper. A first extension arm 134 is fixed at one end by fasteners 136 to the output of parallel gripper element 132 and extends outwardly therefrom in a direction substantially parallel to the direction of movement of rod 108. A second extension arm 140 is fixed at one end by fasteners 142 to the output of parallel gripper element 132 and extends outwardly therefrom in a direction substantially parallel to the direction of movement of rod 108. Arms 134 and 140 are in spaced-apart substantially mutually parallel relation. A substantially cylindrical body 148 of applicator housing 74 is fixed by fasteners 150 to the outer ends of arm 134 and carries applicator element 70. Operator element 70 is oriented such that the longitudinal axis thereof is substantially perpendicular to the direction of movement of the output plunger 108 of powered slide 100. Operation of parallel gripper 132 to move arm 134 extends and retracts operator element 70 along the longitudinal axis thereof in a manner which will be described. A substantially cylindrical body 154 of applicator housing 76 is fixed by fasteners 156 to the outer end of arm 136 and carries applicator element 72. Operator element 72 is oriented such that the longitudinal axis thereof is substantially perpendicular to the direction of movement of the output plunger 108 of powered slide 100. Operation of parallel gripper 132 to move arm 140 extends and retracts operator element 72 along the longitudinal axis thereof in a manner which will be described.

The sealant applicator means 60 of the present invention operates in the following manner. It is shown in FIGS. 1–3 in an initial or rest position off-line from transfer path 24. When fastener 46 has been received in the holding fingers 44 of tool 20 a signal is provided to the machine control. This can be done in various ways, for example in response to retraction of a fastener injector component in a typical machine. Then the machine control causes operation of powered slide 100 to extend rod 108 to the right as viewed in FIGS. 1 and 3 to gripper 132 and move arms 134 and 140 and with them applicator elements 70 and 72 into association with transfer path 24 and on opposite sides of fastener 46 which is held by tool 20. In the machine shown, this positioning would place the longitudinal axis of applicator elements in alignment with transfer path 24. At this point the switch operators 120, 124 have moved to a position operating switch 114 to signal the machine control that sealant applicator mean 60 has reached this first position. Then, the machine control operates parallel gripper 132 to move arms 134 and 140 toward each other thereby moving applicators 70 and 72 toward each other and into contact with the shank of fastener 46 in a gripping, jaw-like manner. This is sensed by a gripper switch 158 which signals the machine control whereupon it causes flow of sealant from a supply through a conduit to the passages 88 and 90 of the sealant applicators 70 and 72, respectively, for application to the fastener. The switch 158 also initiates a predetermined dwell time within gripper 132. A controlled amount of sealant is supplied, whereupon at the conclusion of such sealant application corresponding to the end of the aforementioned dwell time gripper 132 moves arms 134, 140 away from each to retract applicators 70, 72. The machine control also operates powered slide 100 to return the sealant applicator means 60 to the initial or rest portion of FIGS. 1–3 ready for operation when the next fastener is in tool 20.

While the sealant applicator means 60 illustrated in the machine of FIGS. 1–3 moves into and out of association with transfer path 24, other arrangements can be employed wherein sealant applicator means 60 moves from an initial or rest position to any location relative to the machine where the fastener is held in spaced relation to workpiece 14 and prior to installation therein.

Thus, an important advantage of the sealant applicator means 60 of the present invention is that it provides application of sealant to fasteners automatically as part of the automatic fastener installation operation. Another important advantage is that the individual sealant applicators 70, 72 can be removed readily and easily for maintenance and placement. In particular, the applicators 70, 72 can be removed for cleaning when they become clogged or otherwise impaired due to the nature of the sealant. Also, applicators 70 and 72 can be replaced with applicators having different shaped and dimensional ends 84 and 86 to accommodate different types and kinds of fasteners having different sized and/or shaped shanks. The foregoing is illustrated in detail in FIGS. 4–7.

Figure 4:
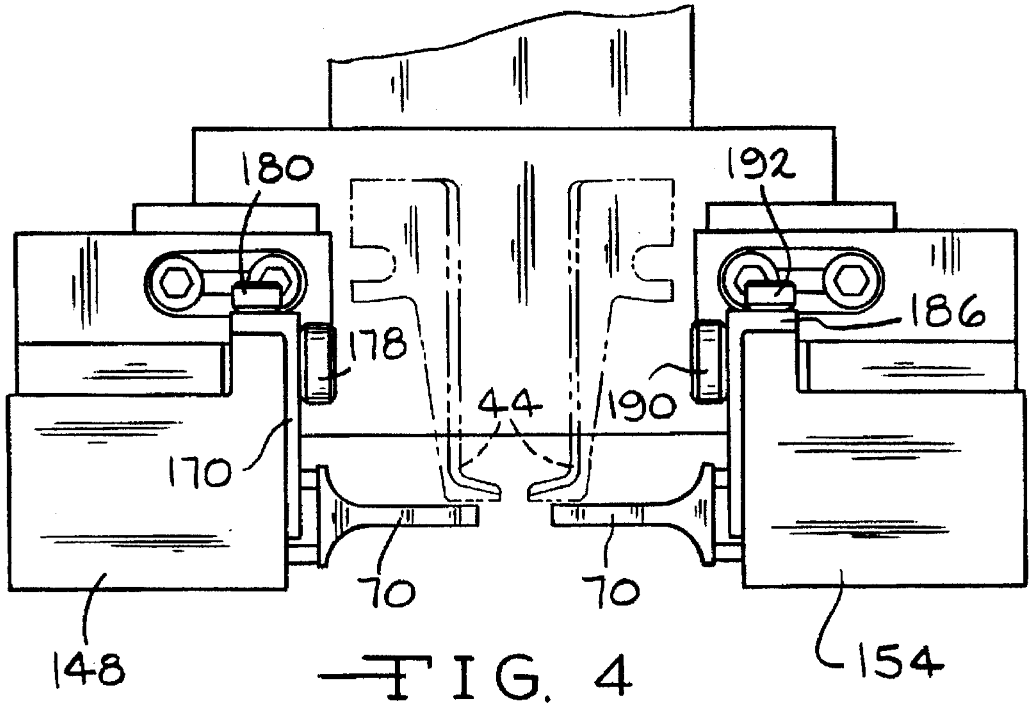
FIG. 4 is a fragmentary elevational view taken about on line 4—4 in FIG. 1.

Referring first to FIG. 4, there is shown applicators 70 and 72 extending from the applicator housings 74 and 76, respectively, which include the substantially cylindrical bodies 148 and 154, respectively. An end portion of applicator 70 extends into the cylinder housing body 148 and is removably held therein by a guide bracket 170 which straddles applicator 70 and is connected to housing 148 by a thumb screw 178 in a manner which will be described. A knob 180 on bracket 170 facilitates handling thereof. Similarly, an end portion of applicator 72 extends into the housing body 154 and is removably held therein by a guide bracket 186 which straddles applicator 72 and is connected to housing 154 by a thumbscrew 190 in a manner which will be described. Likewise, a knob 192 on bracket 186 facilitates handling thereof.

Figure 5:
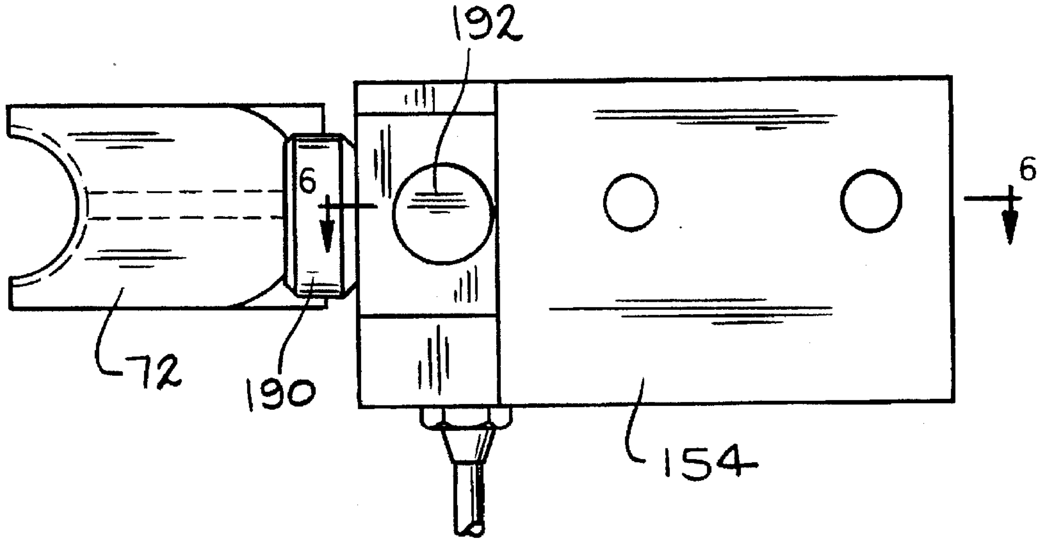
FIG. 5 is an enlarged plan view of one of the sealant applicators included in the sealant applicator means of FIGS. 1–4.
Figure 6:
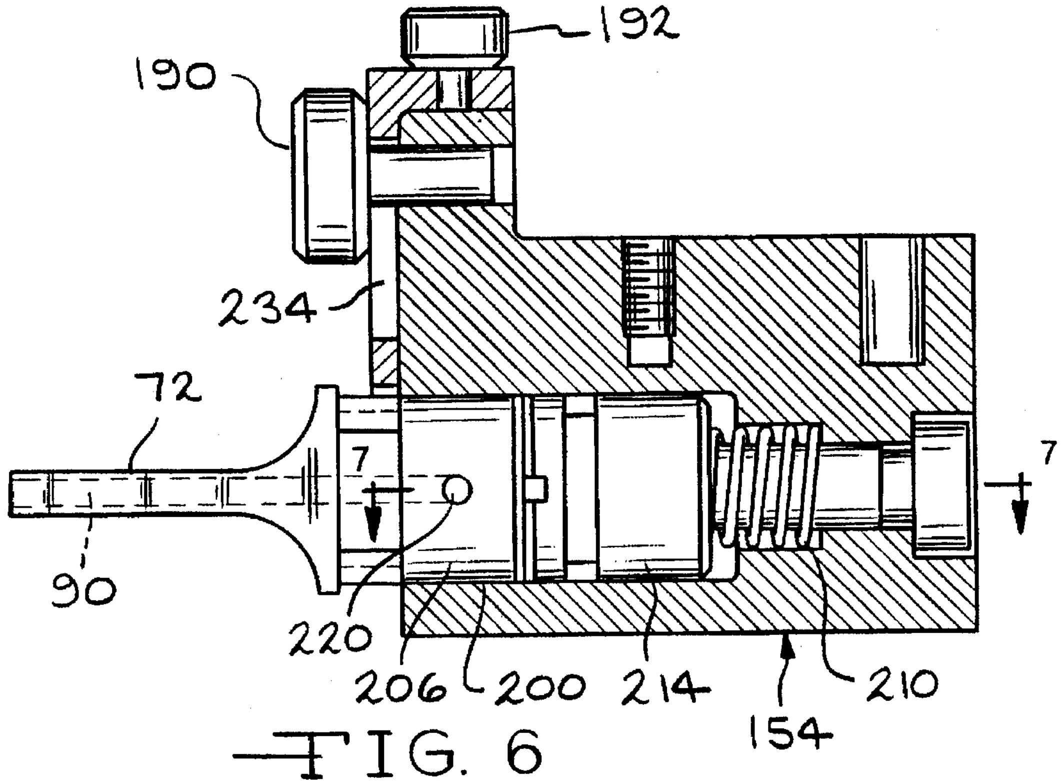
FIG. 6 is a sectional view taken about on line 6—6 in FIG. 5.
Figure 7:
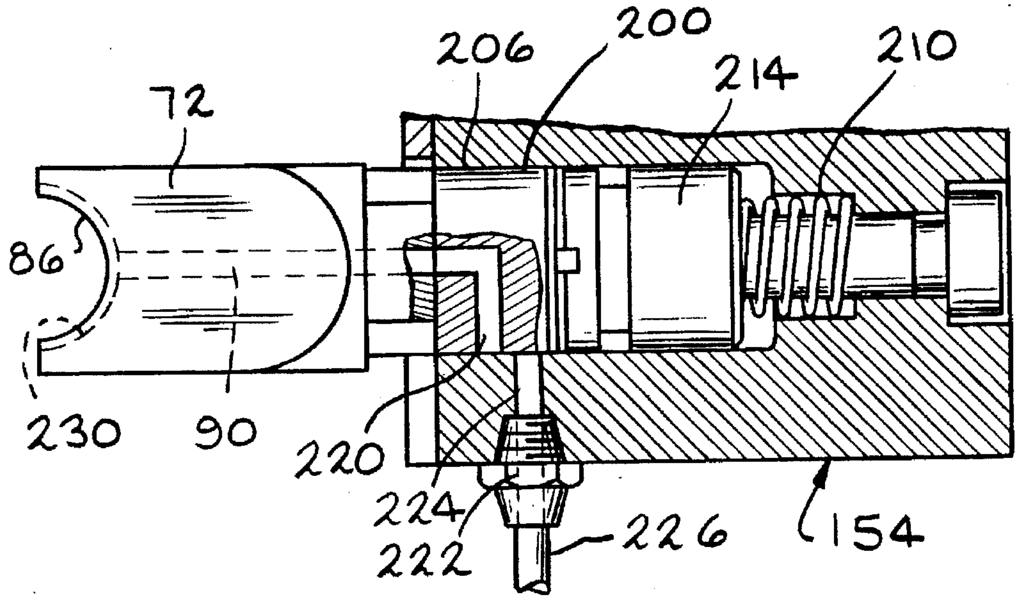
FIG. 7 is a sectional view taken about on line 7—7 in FIG. 6.

FIGS. 5–7 illustrate in further detail one of the applicator-housing combinations shown in FIG. 4, in particular applicator 72 and housing 76. Only this combination is shown and described in detail for convenience, it being understood that the combination of applicator 70 and housing 74 is identical in structure and operation. As shown in FIGS. 6 and 7 housing body 154 has a passage 200 therein into which an end portion 206 of the applicator 72 is firmly but movably received. A biasing means in the form of coil spring 210 is located at the inner end of passage 200. Between spring 210 and body portion 206 is positioned a piston 214 which interfaces between biasing spring 210 and applicator 72. Passage 90 of applicator 72 has a radially outwardly extending branch 220. A sealant supply port 222 and passage 224 are provided in housing body 154 and receive sealant via a supply line 226 leading from a source on the machine. In response to operation of gripper 132 via arm 140 to move applicator 72 into contact with the shank of the fastener, as shaped end 86 contacts the shank applicator 72 is moved a short distance, i.e. overtravel, into passage 200 against the force of biasing spring 210 whereupon passages 220 and 224 are aligned. This overtravel of applicator 72 is sensed by suitable means, such as the switch 158 previously described, to signal the machine control to cause a controlled quantity of sealant to flow from the source through conduit 226 and thus to passage 90 and along within a recess 230 in shaped end 86 to apply sealant to the portion of the fastener shank contacted by shaped end 86.

When it is desired to remove applicator 72 for maintenance or replacement, thumb screw 190 is loosened, bracket 186 is grasped by means of knob 192 and moved laterally of applicator 72 by virtue of the elongated slot 234 in bracket 186 until the legs of bracket 186 are clear of applicator 72 whereupon it can be withdrawn from passage 200. Furthermore, the relationship between the legs of bracket 186 and body portion 206 of applicator 72 is such that body portion 206 can be inserted only one way into passage 200 to ensure proper relationship between passage 220 and 224.

It is therefore apparent that the present invention accomplishes its intended objects. While an embodiment of the present invention has ben described in detail, that is for the purpose of illustration, not limitation.

What is claimed is:

1. In an automatic fastening machine for installing fasteners in a workpiece wherein a work axis is disposed substantially normal to a plane containing said workpiece and said axis is substantially centered at a location of fastener installation and wherein a transfer means carries at least one tool along a transfer path for movement into and out of registry with said work axis for performing a fastener installation operation on said workpiece:

a) sealant applicator means carried by said machine and movable into and out of association with said transfer path for applying sealant to a fastener prior to installation in said workpiece and while said fastener is held at a location on said transfer path; and b) means for moving said sealant applicator means into and out of association with said transfer path and into and out of operative association with said fastener for applying sealant to said fastener.

2. In an automatic fastening machine for installing fasteners in a workpiece wherein a work axis is disposed substantially normal to a plane containing said workpiece and said axis is substantially centered at a location of fastener installation and wherein a transfer means carries at least one tool along a transfer path for movement into and out of registry with said work axis for performing a fastener installation operation on said workpiece:

sealant applicator means carried by said machine and movable into and out of association with said transfer path for applying sealant to a fastener prior to installation in said workpiece and while said fastener is held at a location on said transfer path, said sealant applicator means comprising a sealant applicator, first motive means for moving said applicator from a location out of said transfer path to a location in operative association with said transfer path, and second motive means for moving said applicator into operative association with said fastener for applying sealant to said fastener.

3. In an automatic fastening machine for installing fasteners in a workpiece wherein a work axis is disposed substantially normal to a plane containing said workpiece and said axis is substantially centered at a location of fastener installation and wherein a transfer means carries at least one tool along a transfer path for movement into and out of registry with said work axis for performing a fastener installation operation on said workpiece:

sealant applicator means carried by said machine and movable into and out of association with said transfer path for applying sealant to a fastener prior to installation in said workpiece and while said fastener is held at a location on said transfer path, said sealant applicator means comprising a pair of sealant applicators in spaced-apart opposed facing relation, first motive means for moving said pair of applicators from a location out of said transfer path to a location in operative association with said transfer path, and second motive means for moving said applicators into operative association with said fastener for applying sealant to said fastener.

4. An automatic fastening machine according to claim 3, wherein each of said applicators includes means enabling removal thereof for maintenance and replacement.

5. An automatic fastening machine according to claim 4, wherein each of said sealant applicators comprises an elongated body having one end operatively coupled to said second motive means, having another end shaped to conform to a portion of the outer surface of said fastener, and having passage means extending along within said body to said shaped end for conveying sealant to the outer surface of said fastener.

6. An automatic fastening machine according to claim 5, wherein said shaped end is arcuate and substantially semicircular so as to conform to a fastener having a cylindrical shank and wherein said passage means opens at a location substantially mid-way along said arcuate shaped end.

7. An automatic fastening machine according to claim 5, wherein said one end of said elongated body is movably received in a passage in a housing connected to said second motive means, and further including biasing means carried by said coupling means for acting on said body.

8. In an automatic fastening machine for installing fasteners in a workpiece wherein a work axis is disposed substantially normal to a plane containing said workpiece and said axis is substantially centered at a location of fastener installation and wherein a transfer means carries a plurality of tools in spaced-apart relation for movement along a transfer path into and out of registry with said work axis for performing fastener installation operations on said workpiece, one of said tools carrying a fastener prior to installation in said workpiece:

a) sealant applicator means carried by said machine frame and movable from a location out of said transfer path to a location associated with said path and in operative association with said fastener while carried by said one tool for applying sealant to said fastener prior to installation in said workpiece and when said fastener is at a location on said transfer path out of registry with said work axis for performing an operation on said workpiece; and b) means for moving said sealant applicator means into and out of association with said transfer path and into and out of operative association with said fastener for applying sealant to said fastener.

9. In an automatic fastening machine for installing fasteners in a workpiece wherein a work axis is disposed substantially normal to a plane containing said workpiece and said axis is substantially centered at a location of fastener installation and wherein a transfer means carries a plurality of tools in spaced-apart relation for movement along a transfer path into and out of registry with said work axis for performing fastener installation operations on said workpiece, one of said tools carrying a fastener prior to installation in said workpiece:

sealant applicator means carried by said machine and movable from a location out of said transfer path to a location associated with said path and in operative association with said fastener while carried by said one tool for applying sealant to said fastener prior to installation in said workpiece and when said fastener is at a location on said transfer path out of registry with said work axis and another one of said tools is in registry with said work axis for performing an operation on said workpiece, said sealant applicator means comprising a sealant applicator, first motive means for moving said applicator from said location out of said transfer path to said location in association with said transfer path, and second motive means for moving said applicator into operative association with said fastener for applying sealant to said fastener.

10. In an automatic fastening machine for installing fasteners in a workpiece wherein a work axis is disposed substantially normal to a plane containing said workpiece and said axis is substantially centered at a location of fastener installation and wherein a transfer means carries a plurality of tools in spaced-apart relation for movement along a transfer path into and out of registry with said work axis for performing fastener installation operations on said workpiece, one of said tools carrying a fastener prior to installation in said workpiece:

sealant applicator means carried by said machine and movable from a location out of said transfer path to a location associated with said path and in operative association with said fastener while carried by said one tool for applying sealant to said fastener prior to installation in said workpiece and when said fastener is at a location on said transfer path out of registry with said work axis and another one of said tools is in registry with said work axis for performing an operation on said workpiece, said sealant applicator means comprising a pair of sealant applicators in spaced-apart opposed facing relation, first motive means for moving said pair of applicators from said location out of said transfer path to said location in association with said transfer path, and second motive means for moving said applicators into operative association with said fastener for applying sealant to said fastener.

11. An automatic fastening machine according to claim 10, wherein each of said applicators includes means enabling removal thereof for maintenance and replacement.

12. An automatic fastening machine according to claim 10, wherein each of said sealant applicators comprises an elongated body having one end operatively coupled to said second motive means, having another end shaped to conform to a portion of the outer surface of said fastener, and having passage means extending along within said body to said shaped end for conveying sealant to the outer surface of said fastener.

13. An automatic fastening machine according to claim 12, wherein said shaped end is arcuate and substantially semi-circular so as to conform to a fastener having a cylindrical shank and wherein said passage means opens at a location substantially mid-way along said arcuate shaped end.

14. An automatic fastening machine according to claim 13, wherein said one end of said elongated body is movably received in a passage in a housing connected to said second motive means, and further including biasing means carried by said coupling means for acting on said body.

15. In an automatic fastening machine for installing fasteners in a workpiece and including at least one tool for performing a fastener installation operation on said workpiece:

a) means for holding a fastener in spaced relation to said workpiece prior to installation therein; and b) sealant applicator means movable into and out of operative association with said fastener for applying sealant to said fastener prior to installation in said workpiece, said sealant applicator means comprising a pair of sealant applicators in spaced-apart opposed facing relation and movable toward each other into sealant applying relation with said fastener.

16. An automatic fastening machine according to claim 15 further including means enabling removal of said applicators for maintenance and replacement.

17. An automatic fastening machine according to claim 15, wherein each of said sealant applicators comprises an elongated body having one end operatively connected to motive means for moving the applicator, having another end shaped to conform to a portion of the outer surface of said fastener, and having passage means extending along within said body to said shaped end for conveying sealant to the outer surface of said fastener.

18. An automatic fastening machine according to claim 17, wherein said shaped end is arcuate and substantially semi-circular so as to conform to a fastener having a cylindrical shank and wherein said passage means opens at a location substantially mid-way along said arcuate shaped end.

19. An automatic fastening machine according to claim 18, wherein said one end of said elongated body is movably received in a passage in a housing connected to said motive means, and further including biasing means carried by said coupling means for acting on said body.

* * * * *